US012572558B2

(12) United States Patent
Pareek et al.

(10) Patent No.: US 12,572,558 B2
(45) Date of Patent: Mar. 10, 2026

(54) APPARATUS AND METHOD FOR GUARANTEEING EXACTLY ONCE DELIVERY OF CHANGE DATA EVENTS TO A DOCUMENT-ORIENTED DATABASE ON RECOVERY

(71) Applicant: Striim, Inc., Palo Alto, CA (US)

(72) Inventors: Alok Pareek, Hillsborough, CA (US); Arul Anand Joseph Peter, Chennai (IN); Karthik Purushothaman, Chennai (IN); Mahadevan Lakshminarayanan, Bangalore (IN)

(73) Assignee: Striim, Inc., Palo Alto, CA (US)

( * ) Notice: Subject to any disclaimer, the term of this patent is extended or adjusted under 35 U.S.C. 154(b) by 8 days.

(21) Appl. No.: 18/331,820

(22) Filed: Jun. 8, 2023

(65) Prior Publication Data
US 2024/0411772 A1 Dec. 12, 2024

(51) Int. Cl.
*G06F 16/27* (2019.01)
*G06F 16/23* (2019.01)

(52) U.S. Cl.
CPC .......... *G06F 16/27* (2019.01); *G06F 16/2358* (2019.01); *G06F 16/2365* (2019.01)

(58) Field of Classification Search
None
See application file for complete search history.

(56) References Cited

U.S. PATENT DOCUMENTS

| | | | | |
|---|---|---|---|---|
| 8,868,506 | B1 * | 10/2014 | Bhargava | G06F 16/219 |
| | | | | 707/648 |
| 2019/0281010 | A1 * | 9/2019 | Teverovsky | H04L 61/4552 |
| 2021/0034398 | A1 * | 2/2021 | Khandkar | G06F 11/1464 |

OTHER PUBLICATIONS

International Search Report and Written Opinion for PCT/US2024/032348, dated Sep. 4, 2024, 9 pages.

* cited by examiner

*Primary Examiner* — Umar Mian
(74) *Attorney, Agent, or Firm* — Cooley LLP

(57) ABSTRACT

A non-transitory computer readable storage medium has instructions executed by a processor to receive change data events from a data source. Ordered positions of the change data events are maintained using a system checkpoint. The change data events are written to a document-oriented data store including a change data event collection and a change data event target checkpoint collection. There is an identification when an ordered position of change data events at the system checkpoint is lower than an ordered position of change data events in the change data event target checkpoint collection. Data source records following a position of change data events at the system checkpoint are collected. Records up to the position of change data events in the change data event target checkpoint collection are discarded and de-duplicated for exactly once delivery.

6 Claims, 5 Drawing Sheets

APPARATUS AND METHOD FOR GUARANTEEING EXACTLY ONCE DELIVERY OF CHANGE DATA EVENTS TO A DOCUMENT-ORIENTED DATABASE ON RECOVERY

FIELD OF THE INVENTION

This invention relates generally to data replication in a computer network. More particularly, this invention relates to techniques for guaranteeing delivery of change data events to a document-oriented database.

BACKGROUND OF THE INVENTION

A document-oriented database, or document store, is a computer program and data storage system designed for storing, retrieving and managing document-oriented information, also known as semi-structured data. The central concept of a document-oriented database is the notion of a document. While each document-oriented database implementation differs on the details of this definition, in general, they all assume documents encapsulate and encode data (or information) in some standard format or encoding. Encodings in use include XML, YAML, JSON and BSON. Document-oriented databases are one of the main categories of NoSQL databases.

Document-oriented databases contrast strongly with the traditional relational database (RDB). Relational databases generally store data in separate tables with a scheme definition that are defined by the programmer. A single object may be spread across several tables. Document databases are generally schema less and offer the flexibility to store all information for a given object in a single instance in the database, and every stored object can be different from every other. This eliminates the need for object-relational mapping while loading data into the database. Structure Query Language (SQL) commands are used to process data in a relational database. Thus, relational databases are synonymous with SQL databases, in contrast to "not only SQL" (NoSQL) databases, such as document-oriented databases that are non-tabular.

Relational databases have long supported ACID (atomicity, consistency, isolation, durability) transactions that guarantee data validity despite errors, power failures, and other mishaps. Similar transactional semantics do not always exist in a document-oriented database. In a data replication topology where data is being delivered into a document database, lack of transaction support makes guaranteed delivery of data to a document-oriented database on recovery difficult.

SUMMARY OF THE INVENTION

A non-transitory computer readable storage medium has instructions executed by a processor to receive change data events from a data source. Ordered positions of the change data events are maintained using a system checkpoint. The change data events are written to a document-oriented data store including a change data event collection and a change data event target checkpoint collection. There is an identification when an ordered position of change data events at the system checkpoint is lower than an ordered position of change data events in the change data event target checkpoint collection. Data source records following a position of change data events at the system checkpoint are collected. Records up to the position of change data events in the change data event target checkpoint collection are discarded and de-duplicated for exactly once delivery.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
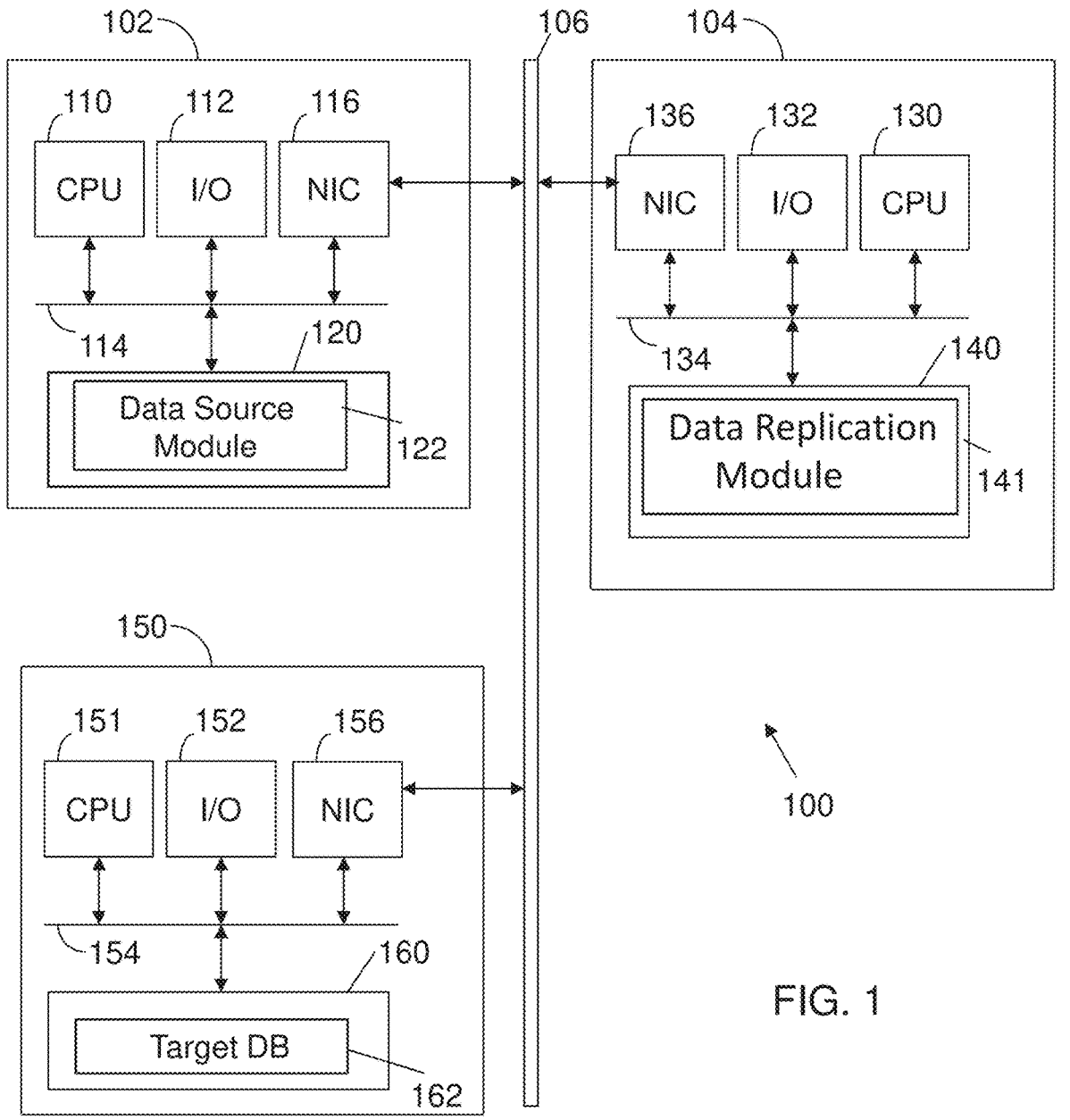
FIG. 1 illustrates a system configured in accordance with an embodiment of the invention.

FIG. 1 illustrates a system 100 configured in accordance with an embodiment of the invention. A data source machine 102 is in communication with a server 104 via a network 106, which may be in any combination of wired and wireless networks. The data source machine 102 may be a change data event stream machine, an operations log machine or a redo log machine. A target machine 150 is also connected to the network.

Server 104 coordinates a data replication operation of document-oriented information (semi-structured data) from the data source machine 102 to a target database 162 within the target machine 150. The target database is a document-oriented database. The data replication module 141 of server 104 guarantees efficient delivery of the data from the source to the target.

Data source machine 102 includes a processor 110 and input/output devices 112 connected via a bus 114. The input/output devices 112 may include a keyboard, mouse, touch display and the like. A network interface circuit 116 is also connected to bus 114 to provide connectivity to network 106. A memory 120 is also connected to bus 114. The memory 120 stores a data source module 122 with instructions executed by processor 110 to deliver document-oriented source data to server 104 for routing to target machine 150. Data source machine 102 may be a server, computer, tablet or any other processing machine.

Server 104 includes a processor 130, input/output devices 132, a bus 134 and a network interface circuit 136. A memory 140 is connected to the bus 134. The memory 140 stores a data replication module 141 with instructions executed by processor 130 to implement the operations discussed in connection with FIGS. 2 and 3.

Target machine includes a processor 151, input/output devices 152, bus 154 and network interface circuit 156. A memory 160 is connected to bus 154. The memory stores a target database 162 with instructions executed by processor 151 to implement operations disclosed herein. The target database 162 is a document-oriented database that includes a change data event collection and a change data event target collection. The change data event collection maintains data on events written to the document-oriented database. The change data event target collection maintains ordered position of change data events committed to the document-oriented database. In a NoSQL database a collection is a structure used to group documents together using a system of categorization.

Figure 2:
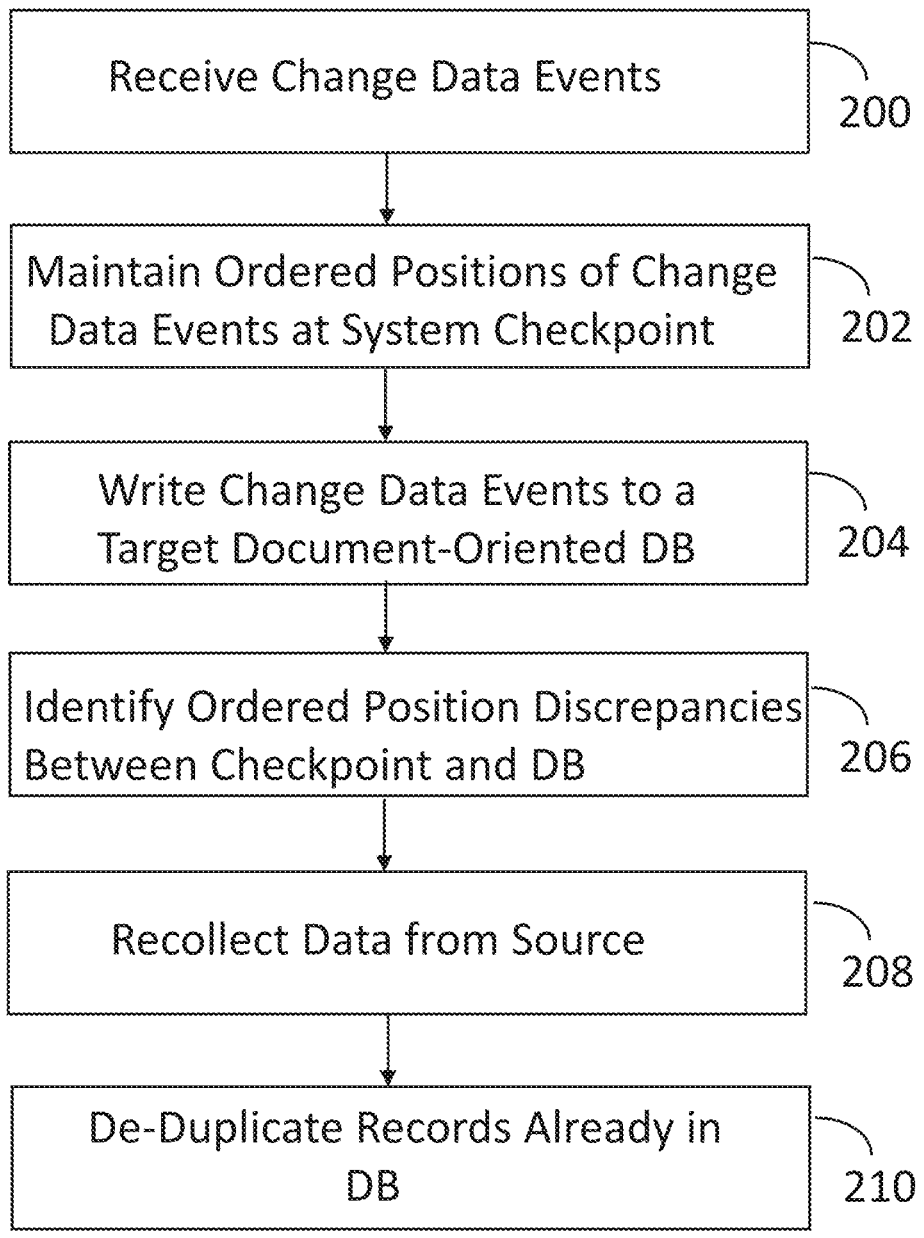
FIG. 2 illustrates processing operations performed in accordance with an embodiment of the invention.

FIG. 2 illustrates processing operations performed by the data replication module 141. Change data events are received 200, for example from data source machine 102. The change data events include non-relational data, such as from a change data event stream machine, operations log machine or redo log machine. Ordered positions of change data events are maintained at a system checkpoint 202. The system checkpoint is maintained within the data replication module 141. The data is then written by the data replication module 141 to a target document-oriented database 204, such as target machine 150 with target database 162.

Discrepancies in ordered change data event positions at the checkpoint and the target database are identified 206. In the event of a discrepancy data is recollected from the data source 208. The data recollected corresponds to the records after the highest value at the checkpoint. Recollected data that is already written to the target database, as indicated by change data event target checkpoint collection, is de-duplicated 210, and therefore is not written to the target database once again.

Figure 3:
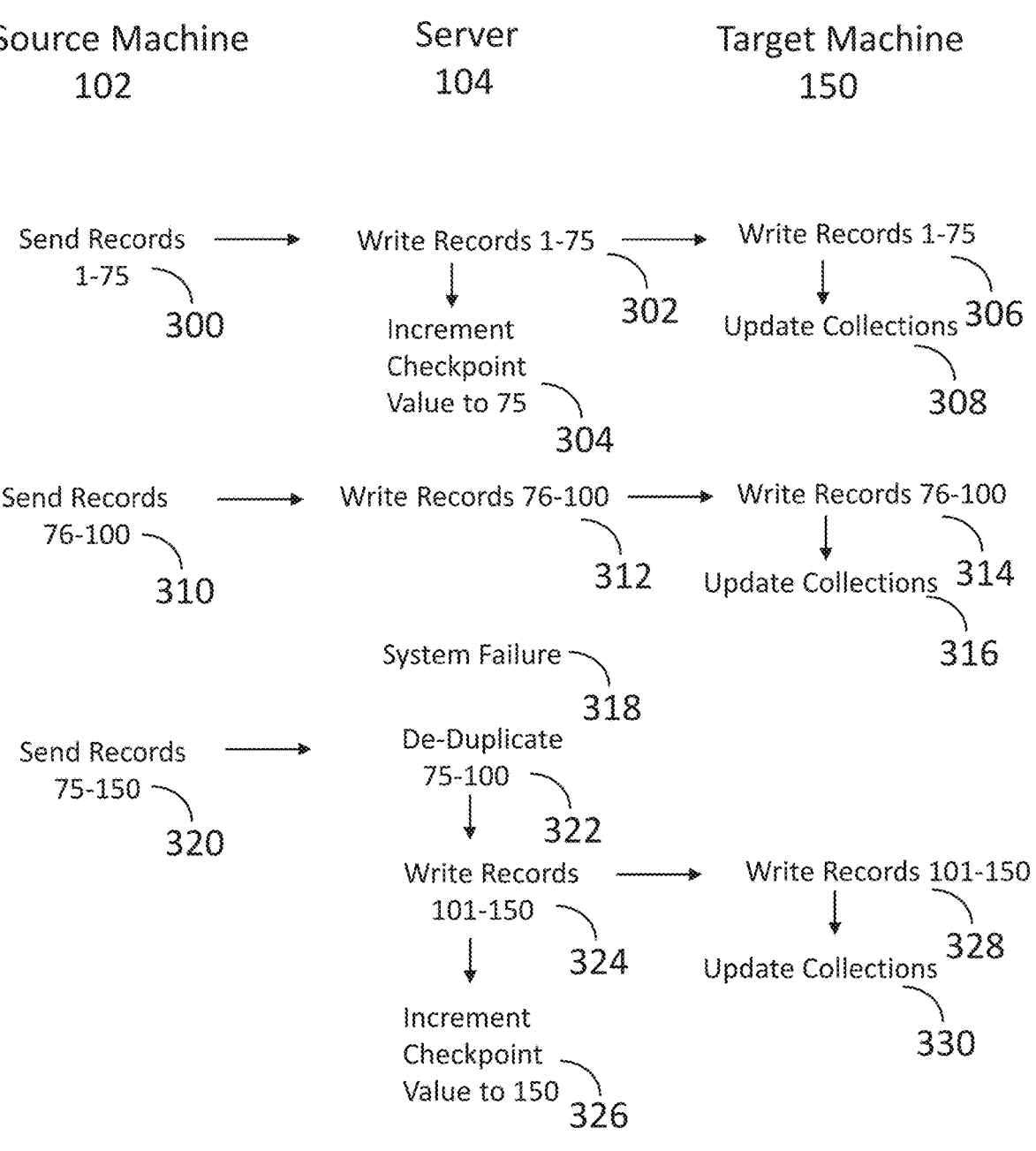
FIG. 3 illustrates distributed processing operations performed in accordance with an embodiment of the invention.

These operations are more fully appreciated with reference to FIG. 3, which shows interactions between source machine 102, server 104 and target machine 150. Initially, records 1-75 are sent 300 from the source machine 102. The server 104 writes 302 records 1-75 to the target machine 150 and increments its checkpoint value 304 to 75. At the target machine 150, the records are written 306 and the change data event collection and change data event target checkpoint collection are updated 308.

A second set of records 76-100 is sent 310 from the source machine 102. The server writes 312 records 76-100 to target machine 150. The target machine 150 writes 314 records 76-100 and updates its collections 316. At this point there is a system failure 318. To complete the write process the server notes the discrepancy between the highest ordered position at the system checkpoint and the highest ordered position in the change data event target checkpoint collection. In this example, the system checkpoint has a value of 75, but the change data event target check point collection has a value of 100. Therefore, the server 104 requests 320 records starting at 75, plus additional records up to 150. Since records 76-100 are already in the target machine, records 75-100 are deduplicated 322 and records 101-150 are written 324 to target machine 150. Target machine 150 writes the records 328 and updates its collections 330. The system checkpoint value is incremented 326 to a final value of 150.

Thus, the disclosed system provides guaranteed exactly once delivery of data to a document-oriented database. These techniques are successfully used in a variety of contexts, including replicating change data events from a streaming machine, operations log machine and redo log machine.

An embodiment of the invention is implemented with MongoDB®. MongoDB® is one of the most popular NoSQL document store databases with optional schemas using JSON-like documents. The data replication module 141 supports continuous reading of changes made to MongoDB® collection (Change Data Capture, CDC) using MongoDBReader® as s source component. Changes made to the collections are seen as data replication module events. The data replication module 141 also supports writing the data replication module events to the MongoDB® collection using MongoDB Writer® as a target component. Every data replication module event usually carries a unique position value that represents the origin of the events. For example, SCN for Oracle® sources, LSN for PostgreSQL, file offset for the file sources, Kafka® offset for the Kafka® sources etc. This helps the data replication module 141 to reposition to the specific source system at the time of recovery due to a system HALT or regular restart and recovery scenarios.

When processing events using MongoDBWriter®, duplicate events can be replayed when a data pipeline that contains MongoDBReader® or MongoDBWriter® is restarted after a normal stop or HALT. This guarantees A1P (At Least Once Processing) semantics and not Exactly Once Processing semantics. In other words, events can be sent to the target DB multiple times. To handle duplicate events at MongoDBWriters® gracefully, users need to enable additional features in the replication module 141 to avoid inserting duplicate events (using an "Ignorable Exception Code" property). By default, if the target returns an error because the document already exists, the replication module will halt or terminate. Configurations with values such as DUPLICATE KEY or KEY NOT FOUND can be used to ignore these errors and continue replication processing. This type of configuration can have disadvantages since it can introduce potential data integrity issues if those events are inserted or updated or deleted by another program outside the replication agent. That is because the replication agent cannot differentiate whether the duplicates are a result of a restart/recovery or introduced by another application altogether. It is acceptable to set ignorable exceptions when the events are indeed the "previously identical" events as opposed to chanced duplicates. The distinction is important because comparing the contents of the entire document for an identity match is very expensive and degrades replication performance. Therefore, the way the duplicates are identified relies on specific key matches (versus document matches).

Alternatively, in certain cases users will need to turn on the "Upsert" property to handle such duplicate events. Ideally, to make MongoDBWriter® process events exactly once (E1P), duplicate events should be discarded prior to sending the events to the target DB 162.

It is preferable to avoid using ignorable exceptions code for data integrity semantics. Our technique leverages Exactly once processing (E1P) of events in MongoDB-Writer® using a checkpoint collection along with support for Transaction capability in MongoDB®. To use this feature, a separate collection should be used to store the incoming event position details (count of data writes at the checkpoint).

For MongoDB® server versions 4.0 and higher, MongoDBWriter® can perform transactions on replica sets. For MongoDB® server versions 4.2 and higher, MongoDB-Writer® can perform transactions on sharded clusters. Transaction support is key in achieving E1P support when writing to a MongoDB collection.

The details of how E1P is achieved follow:

When a MongoDBWriter® receives events, it accumulates these events in a buffer and keeps track of the highest water mark of the position value of those buffered events.

MongoDBWriter® creates a new transaction against the target MongoDB®. These transactions usually contain DML operations of those buffered events in a single batch into the target MongoDB® collection.

the Accumulated high water mark position value of those buffered events to the checkpoint collection.

By performing both "batched events write" and the "checkpoint write" in the same transaction, it is guaranteed that the position written to the checkpoint collection is always representative of the last event written to the mapped target collection.

In recovery scenarios, such as when the application (or data pipeline) containing MongoDBWriter® is restarted, a recent high water mark position value is retrieved from the checkpoint collection.

Upon restart, the high water mark checkpoint collection is read and events whose position is lower than the one recorded in the collection are discarded and not sent to the MongoDBWriters. This results in deduplication of already processed events by the MongoDBWritere.

When the application is dropped, MongoDBWriter® additionally deletes the checkpoint entry it created.

MongoDBWriter writes a Bson document with the following fields in the checkpoint collection.

```
{ _id: <striim_component_name>,
    SourcePosition: <position_in_binary>,
    LastUpdatedTimestamp: <timestamp_of_the_entry>
}
An example checkpoint entry is as follows:
    "_id": "admin.MongoTrg",
    "SourcePosition": {
        "$binary": {
            "base64":
"TQAAAAGCQAAAAAIBAGNvbS53ZWJhY3Rpb24ucmVjb3ZlonkuUGF0aCRJdGXtAUAB7a0HloMKY
bkccoSnU1LsAAEAY29tLndlYmFjdGlvbi5yZWNvdmVyeS5QYXRoRoJEl0Ze0BQAHtrQeXC+lxuRx
yhKdTUuwBSU5URVJFU1RFxAEAY29tLnd1YmFjdGlvbi5yZWNvdmVyeS5NeVNRTFNvdXJjZVBvc
2l0aW/uAYzGsbgCT04uMDAwMDKyAZbIsbgCgAEAAQBjb20ud2ViYWN0aW9uLnJlY292ZXJ5Lk1
5U1FMU291cmNlUG9zaXRpb+4BjMaxuAJPTi4wMDAwMrlBlsixuAKAAQA=" ,
            "subType": "00"
        }
    },
    "LastUpdatedTimestamp": {
        "$numberLong": "1683893472009"
    }
}
```

A user interface may be specified as shown in Table I.

TABLE I

| Name | Description | Type | Required | Example |
|------|-------------|------|----------|---------|
| Checkpoint Collection (Used for providing E1P support) | A valid value for this property will turn on E1P support. The value provided here should correspond to a collection in the MongoDB cluster. This collection should be created before the application is run. MongoDBWriter will store the checkpoint information in this collection. The fully qualified name of a collection is its database name suffixed by character "." followed by its name. | String | False | "trg.chkpoint" |

Figure 4:
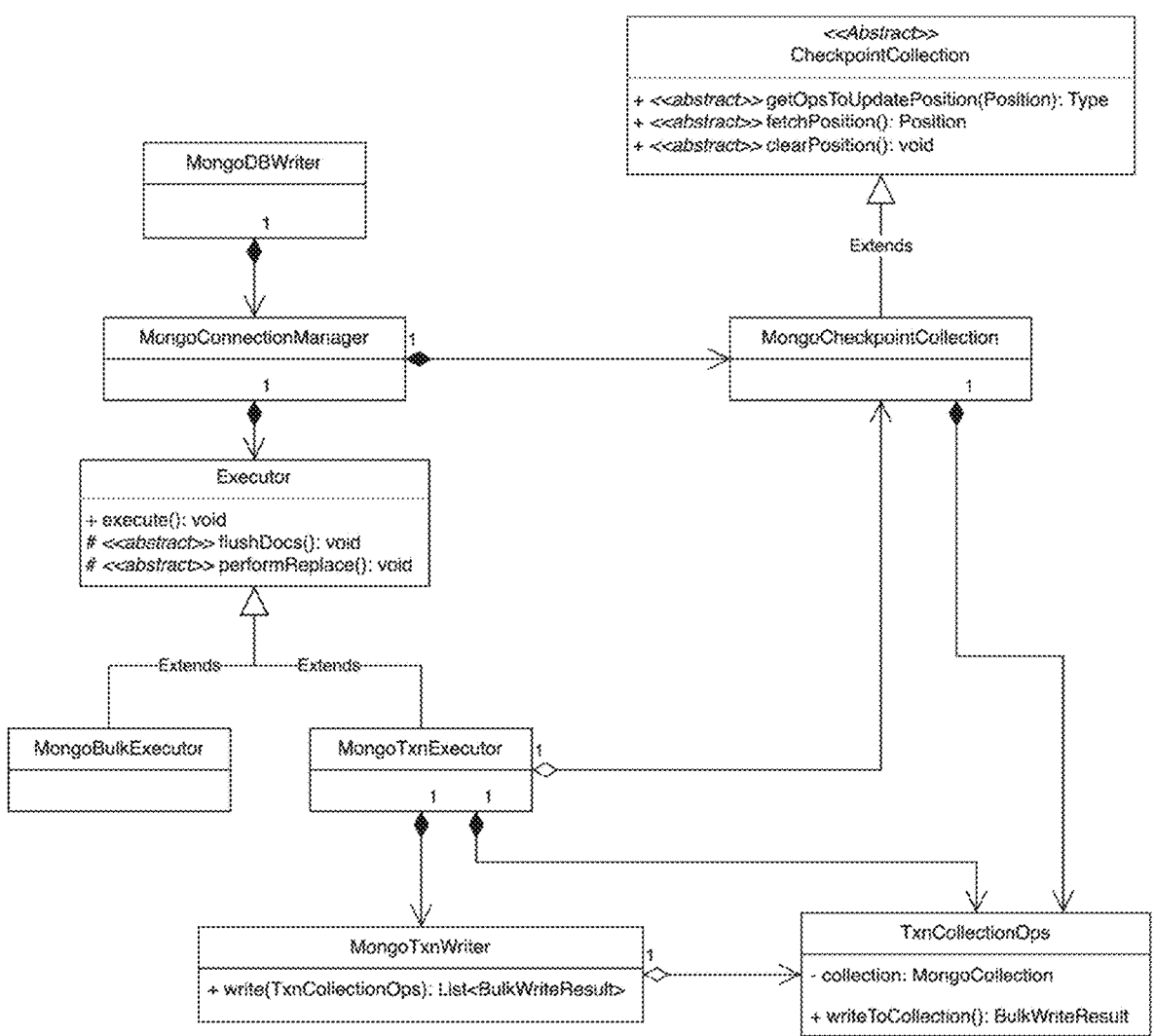
FIG. 4 illustrates interactions between MongoDB® classes associated with an embodiment of the invention.
Figure 5:
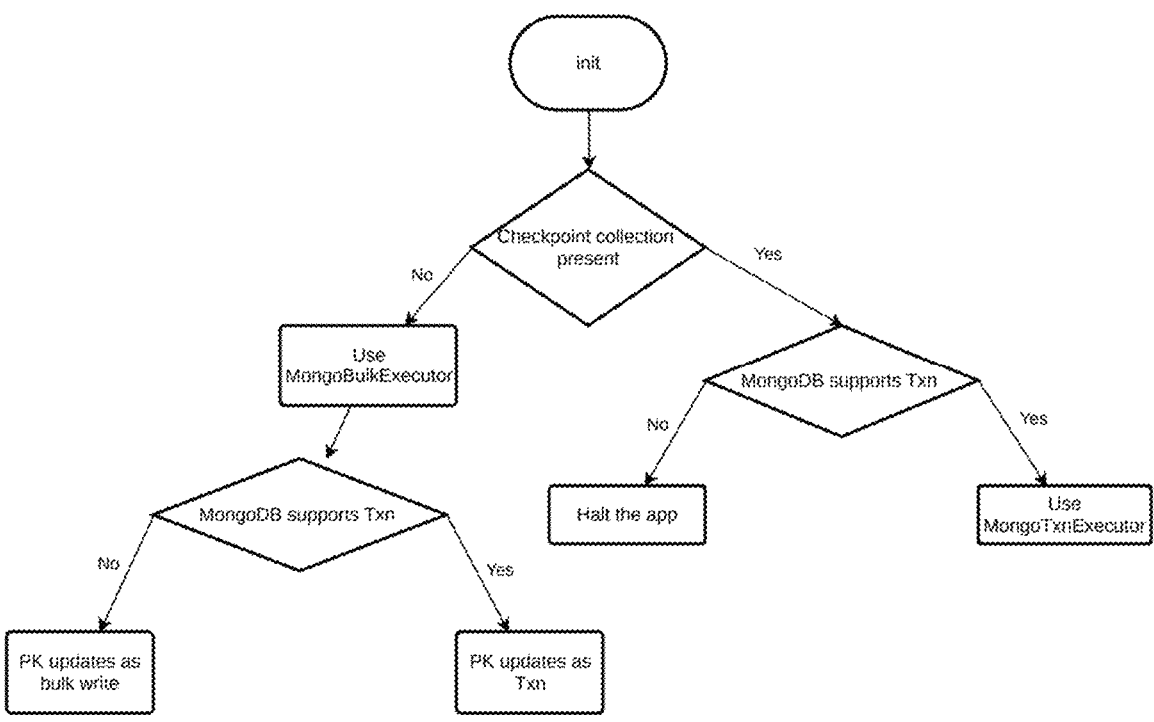
FIG. 5 illustrates flow for when MongoBulk® Executor and the MongoTxnExecutor® are used in accordance with an embodiment of the invention.

FIG. 4 illustrates interactions between MongoDB classes associated with an embodiment of the invention. FIG. 5 illustrates flow for when MongoBulk® Executor and the MongoTxnExecutor® are used in accordance with an embodiment of the invention.

The high-level responsibilities of some of the classes are as follows:

Executor: This abstract class takes care of processing the events received from the adapter and prepares them for execution by either of the implementing MongoBulkExecutor® and MongoTxnExecutor®.

MongoBulkExecutor®: This implementation of Executor executes the writes as bulk writes and provides the logic for error handling associated with bulk writes. This will be the default mode of writing if the Checkpoint Collection is not provided.

MongoTxnExecutor®: This implementation of Executor executes the writes as transactions. This will be the mode of execution if recovery is enabled and a valid Checkpoint Collection is provided.

TxnCollectionOps: This class encapsulates the MongoCollection and the documents that are to be written to that collection.

MongoTxn Writer®: This class is a utility of sorts that helps the MongoTxnExecutor® perform the writes as transactions. This takes in a list of TxnCollectionOps objects and calls the writeToCollection on each of them.

It should be noted that if the specified checkpoint collection is not present in the target MongoDB®, then MongoDBWriter® prompts the user to create a valid checkpoint collection beforehand. Checkpoint collection entries are made only if the recovery option is enabled at the data replication module 141 and a valid checkpoint collection name is specified in the adapter's properties.

An embodiment of the invention implements the target checkpoint collection with an additional document with metadata that indicates the signature of the data replication module 141. Consequently, a bi-directional replication system between NoSQL databases can operate more efficiently by avoiding looping activity. Consider the following example of bi-directional replication from M1 to M2 and from M2 to M1:

Time T1

Records 1 . . . 5 are generated by an application A1 at M1.

Records 6 . . . 10 are generated by an application A2 at M2.

Time T2

Data replication module 141 uses MongoDBWriter at M2 and applies 1 . . . 5 at M2.

Another instance of the data replication module 141 uses MongoDBWriter at M1 and applies 6 . . . 10 at M1.

Now:

The MongoDBWriter at M2 applies records 6 . . . 10 at M2 (the ones it received as a result of M1).

The MongoDBWriter at M1 applies records 1 . . . 5 at M1 (the ones it received as a result of M2).

& so on . . . and on. This is a loop.

To break the loop the data replication module adds a signature (as a first write F) in a transaction. The signature may be in an update document in the checkpoint collection at M2.

The data replication module 141 is configured to ignore reading any changes within transactions that contain the signature, i.e., start with an F.

Consequently, the sequence is:

Time T1

Records 1 . . . 5 are generated by an application A1 at M1.

Records 6 . . . 10 are generated by an application A2 at M2.

Time T2

Data replication module 141 uses MongoDBWriter at M2 and applies 1 . . . 5 at M2 in a Transaction that has these 3 operations:

1. Updates a document with F1 (F1 is a unique value for this MongoBWriter M2).
2. Records 1 . . . 5.
3. High Water Mark of Checkpoint for de-duplication.

Another instance of the data replication module 141 uses MongoDBWriter at M1 and applies 6 . . . 10 at M1 in a Transaction that has these 3 operations:

1. Updates a document with F2 (F2 is a unique value for this MongoBWriter M1).
2. Records 6 . . . 10
3. High Water Mark of Checkpoint for de-duplication MongoDBeader at M1 is implemented to skip sending transactions where F2 is the first change. Similarly, MongoDBeader at M2 is implemented to skip sending transactions where F1 is the first change. Thus, with this embodiment there is loop detection that enables E1P for a bidirectional NoSQL to NoSQL system.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include but are not limited to: magnetic media, optical media, magneto-optical media, and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using an object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:

receive at a data replication module change data events from data sources, where the data replication module is executed by a server in network communication with the data sources;

maintain ordered positions of the change data events using a system checkpoint within the data replication module, where each particular change data event has a unique position value that represents a data source origin of the particular change data event;

write the change data events to a document-oriented data store including a change data event collection and a change data event target checkpoint collection, where the document-oriented data store is in network communication with the server;

identify a discrepancy between an ordered position of change data events at the system checkpoint and an ordered position of change data events in the change data event target checkpoint collection, where the discrepancy indicates a system failure;

after the system failure, collect from the data source origin of the event, data source records that have been written to the document-oriented data store and data source records that have not been written to the document-oriented data store;

de-duplicate the data source records that have been written to the document-oriented data store; and send to the document-oriented data store only the data source records that have not been written to the document-oriented data store.

2. The non-transitory computer readable storage medium of claim 1 wherein the data sources include a network connected data source machine.

3. The non-transitory computer readable storage medium of claim 2 wherein the network connected data source machine is a change data event stream machine.

4. The non-transitory computer readable storage medium of claim 2 wherein the network connected data source machine is an operations log machine.

5. The non-transitory computer readable storage medium of claim 2 wherein the network connected data source machine is a redo log machine.

6. The non-transitory computer readable storage medium of claim 1 further comprising instructions executed by the processor to utilize a signature of the data replication module to support a bi-directional replication system between two document-oriented data stores without looping.

\* \* \* \* \*